United States Patent [19]

Miyata et al.

[11] Patent Number: 4,884,066
[45] Date of Patent: Nov. 28, 1989

[54] DETERIORATION DETECTOR SYSTEM FOR CATALYST IN USE FOR EMISSION GAS PURIFIER

[75] Inventors: Shigeru Miyata; Toshiki Sawada, both of Nagoya, Japan

[73] Assignee: NGK Spark Plug Co., Ltd., Nagoya, Japan

[21] Appl. No.: 121,455

[22] Filed: Nov. 17, 1987

[30] Foreign Application Priority Data

Nov. 20, 1986 [JP] Japan .................. 61-179042[U]

[51] Int. Cl.⁴ .................................................. G08B 17/10
[52] U.S. Cl. .............................. 340/633; 123/198 D; 73/118.1
[58] Field of Search ............. 123/198 D; 73/118.1; 340/632–634; 338/34; 364/431.06, 431.05

[56] References Cited

U.S. PATENT DOCUMENTS

| | | | |
|---|---|---|---|
| 3,946,198 | 3/1976 | Foote | 219/308 |
| 3,969,932 | 6/1976 | Riegler et al. | 60/277 |
| 4,182,300 | 1/1980 | Ono et al. | 123/198 D |
| 4,252,098 | 2/1981 | Tomczak et al. | 123/437 |
| 4,624,232 | 11/1986 | Saito et al. | 123/440 |
| 4,661,234 | 4/1987 | Takahashi et al. | 338/34 |
| 4,733,358 | 3/1988 | Abthoff et al. | 364/431.05 |

Primary Examiner—Joseph A. Orsino
Assistant Examiner—Jill D. Jackson
Attorney, Agent, or Firm—Cooper & Dunham

[57] ABSTRACT

Deterioration detector system for catalyst in use for emission gas purifier, comprising; an emission passageway through which exhaust gas from internal combustion engine, passes by way of catalyst to facilitate the reducing and oxidizing reaction among the toxicant component of hydrocarbon, carbon monoxide and nitrogen oxide; a sensor placed at the emission passageway to position downstream of the catalyst against the exhaust gas flow so as to generate an output in direct proportion to air-fuel ratio in the exhaust gas; an annunciator arranged to activate in response to the output of more than the predetermined level generated from the air-fuel ratio sensor.

4 Claims, 4 Drawing Sheets

DETERIORATION DETECTOR SYSTEM FOR CATALYST IN USE FOR EMISSION GAS PURIFIER

BACKGROUND OF THE INVENTION

1. Field of the Invention

This invention relates to an emission gas purifier carried out by way of catalyst which is in use for exhaust passageway of motor vehicle engine, and particularly concerned to an improved system capable of detecting deteriorating degree of the catalyst.

2. Description of the Prior Art

In a motor vehicle of recent years, an emission gas purifier is equipped. The purifier has catalyst converter of precious metals such as platinum, palladium and Rhodium through which the emission gas passes. During this process, the toxicant gas such as tri-component of hydrocarbon (HC), carbon monoxide (CO) and nitrogen oxide (NOx) is simultaneously reduced in quantity by the mutual reducing and oxidizing reaction among the toxicant gas components. This purifying system is referred to TTC (Toyota Total Clean System) in Toyota Motor Corporation, and NAPS (Nissan Anti-Air Pollution System) in Nissan Motor Corporation.

With the long use of the motor vehicle, however, the catalyst gradually deteriorates to decrease the purifying effect of the exhaust gas. Consequently, there arises a possibility of continuously runnning the motor vehicle without awaring the deterioration of the catalyst.

Therefore, it is an object of this invention to provide a deterioration detector system for catalyst in use for exhaust gas purifier, capable of making a person aware of whether the catalyst is effective or not with high accuracy, thus preventing a vehicle from being continuously used without replacing the catalyst.

According to the invention, there is provided a deterioration detector system for catalyst in use for emission gas purifier, comprising; an emission passageway through which exhaust gas from internal combustion engine, passes by way of catalyst to facilitate the reducing and oxidizing reaction among the gaseous component of hydrocarbon, carbon monoxide and nitrogen oxide; a sensor placed at said emission passageway to position downstream of said catalyst against the exhaust gas flow so as to generate an output substantially in direct proportion to air-fuel ratio in said exhaust gas; an annunciator arranged to activate in response to the output of more than the predetermined level generated from said sensor.

BRIEF DESCRIPTION OF THE DRAWINGS

For a better understanding of the invention and to show how the same may be carried into effect, reference will now be made, by way of example, to the accompanying drawings in which:

FIG. 6 (b) is a graph showing air-fuel ratio and output;

FIG. 6 (c) is a graph showing relationship between air-fuel ratio and output when catalyst deteriorated;

FIG. 6 (d) is a graph showing relationship between output and air-fuel ratio detected by a sensor according to the invention and other sensor when catalyst dedteriorated.

DESCRIPTION OF PREFERRED EMBODIMENT

Figure 1:
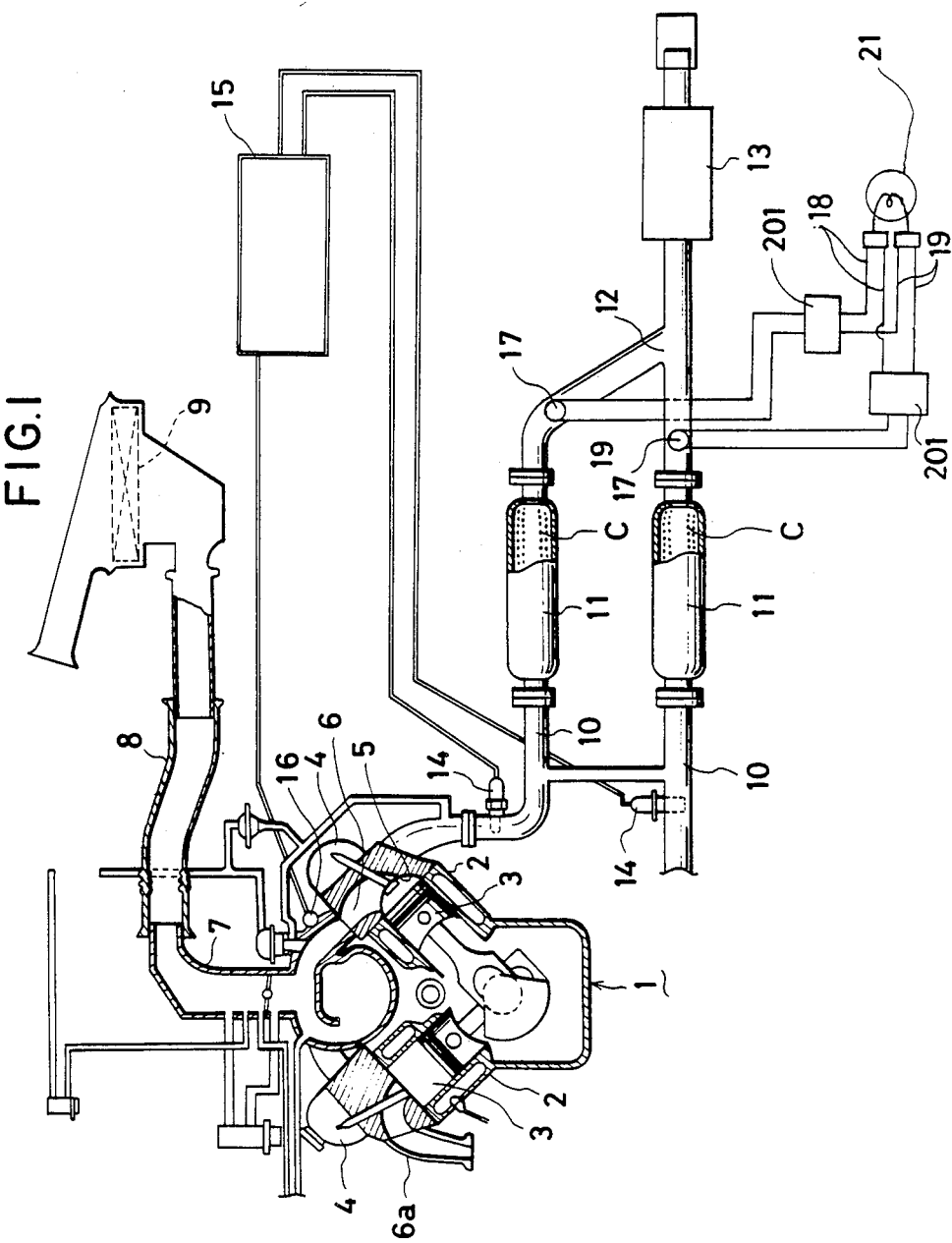
FIG. 1 is a schematic view of a exhaust gas purifier incorporated into an automobile engine.

Referring to the drawings, particularly of FIG. 1, in which exhaust gas purifier incorporated into an automobile engine, is shown. The automobile engine has two cylinders 2, each has reciprocal piston as is well known for those skilled in the art. Numeral 4 designates a cylinder head, numeral 5 being combustion chamber, numeral 6 designates an intake port which is in communication with an air filter 9 through a throttle chamber 7 and an intake pipe 8 respectively. An exhaust pipe, which is designated at numeral 10, is connected at one end to an exhaust port 6a (only one shown), and at other end to an inlet of a catalyst converter 11. The converter 11 has a catalyst (C) of precious metal such as platinum, palladium and Rhodium at the inner side, and an outlet connected to a muffler 13 through an intermediate pipe 12. At the exhaust pipe 10, oxygen sensor 14 is placed to generate an output in accordance with oxygen concentration level in the exhaust gas. The output, thus produced, allows an electronic control fuel injector 15 to calculate the most appropriate amount of fuel to inject it into the combustion chamber 5 through a nozzle 16 so as to adjust the fuel-air ratio to the theoretical ratio.

Figure 2:
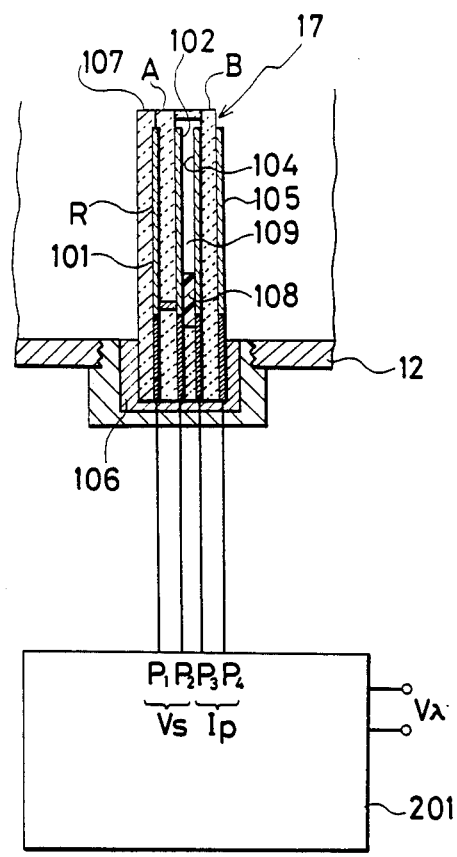
FIG. 2 is a longitudinal cross sectional view of air-fuel sensor which has direct proportional relationship between air-fuel ratio and output.
Figure 2A:
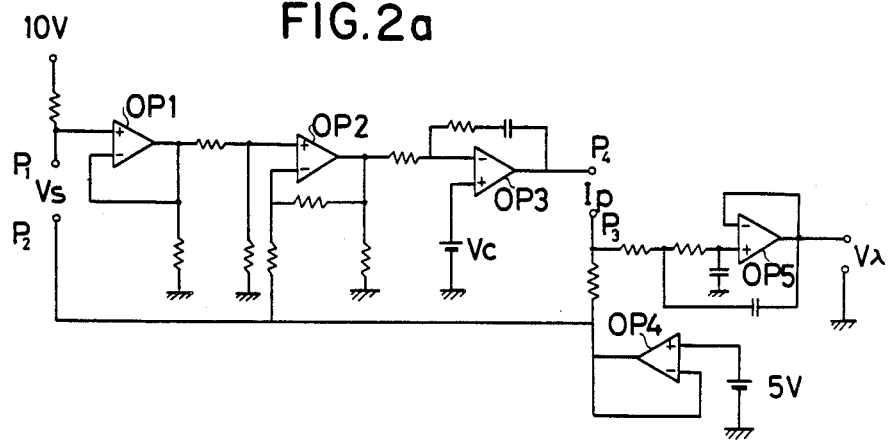
FIG. 2A is the electrode controlling circuit.

Now, an air-fuel ratio sensor 17 is placed at the downstream of the converter 11 against the exhaust gas flow to position in the intermediate pipe 12. The sensor 17 is as shown in FIG. 2 and FIG. 2a, in which a solid electrolyte plates A and B are each arranged in oppositely spaced relationship through a diffusion chamber 109. The electrolytes A and B are made from electrolyte of $Y_2O_3$-$ZrO_2$, each of which is sandwiched by porous electrode layers 101, 102 and 104, 105, made from platinum with an addition of ten weight percent $Y_2O_3$-$ZrO_2$. Numerals 107 and 108 designate a shield plate and spacer respectively.

In this situation, the sensor 17 is hermetically sealed at the lower portion by means of a member 106 so as to prevent a reference oxygen gas (R) from being leaked outside.

The sensor 17 connects the electrode layers 101, 102 and 104, 105 to terminals P1, P2 and P3, P4 of a A/F ratio signal detection circuit 201 through lead wires L1, L2 and L3, L4 in this turn.

The circuit 201 works to control the output across the electrodes 101 and 102 at the predetermined level, the output of which depends on the reference oxygen gas produced from the electrolyte plate A, and the partial pressure of the oxygen gas in the chamber 109. That is to say, The circuit 201 acts on the electrolyte plate B to keep the air-fuel ratio in the chamber 109 constant by controlling the pumping current, the value of which is detected as A/F ratio signal Vλ.

By way of example, the circuit 201 is shown in FIG. 2a, in which operational amplifiers (OP1)-(OP5) are arranged. The output Vs from the electrolyte plate A is amplified by the amplifiers (OP1), (OP2) and compared with a reference voltage Vc. The pumping current is controlled by the voltage produced in accordance with the difference between the voltage Vs and Vc so as to be detected as the signal Vλ from the amplifier (OP5).

The sensor 17, thus constructed, is connected to a switching module 20 from the circuit 201 by way of lead wires 18,19. Across the lead wires 18, 19, a warning lamp is connected in parallel with the switching module 20 to act as an annunciator of this invention.

Figure 3:
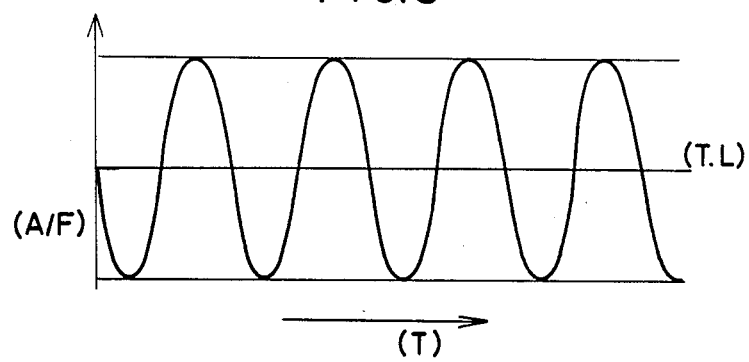
FIG. 3 is a graph showing the relationship between air-fuel ratio (A/F) and passage of time (T).

In so doing, the exhaust gas from the combustion chamber 5 is emitted outside through the exhaust port 6a, pipe 10, the catalyst converter 11 and the muffler 13 respectively. Under this condition, the air-fuel ratio of the exhaust gas which is the upper reach of the catalyst converter 11, is in the pulsating condition against the theoretical ratio (T.L.). The average value of the ratio is controlled to approach the theoretical ratio (T.L) as shown in FIG. 3, in which the air-fuel is referred to as A/F.

Meantime, during the process in which the exhaust gas passes through the catalyst converter 11, the catalyst (C) works to facilitate the reducing and oxidizing reaction among the gaseous tri-component of hydrocarbon (HC), carbon monoxide (CO) and nitrogen oxide (NOx) so as to reduce the toxicant components in the exhaust gas.

Figure 4:
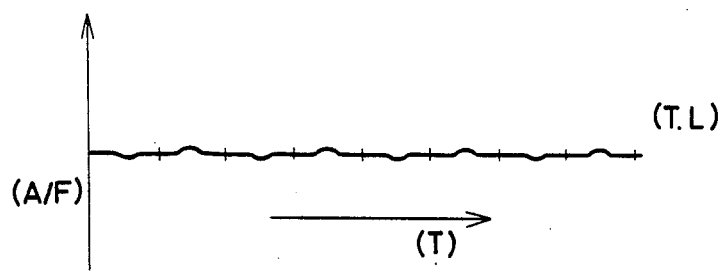
FIG. 4 is a graph showing how the air-fuel ratio (A/F) changes with the passage of time (T) in reference to the theoretical air-fuel ratio (L.T) under normal catalyst.

As a consequence, the catalyst (C) permits the air-fuel rato of the exhaust gas to approach to the theoretical ratio (T.L) under the normal condition as shown in FIG. 4, in which the air-fuel ratio is abbreviated as A/F.

Figure 5:
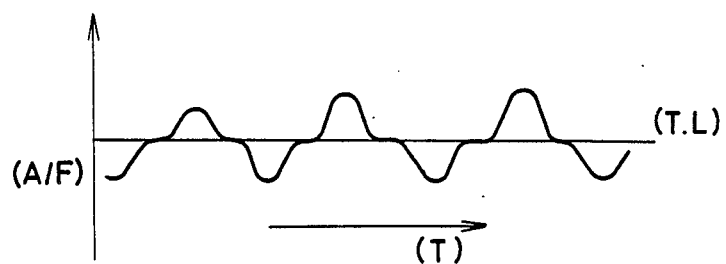
FIG. 5 is a graph showing how the air-fuel ratio (A/F) changes with the passage of time (T) in reference to the theoretical air-fuel ratio (L.T) under deteriorated catalyst.
Figure 6A:
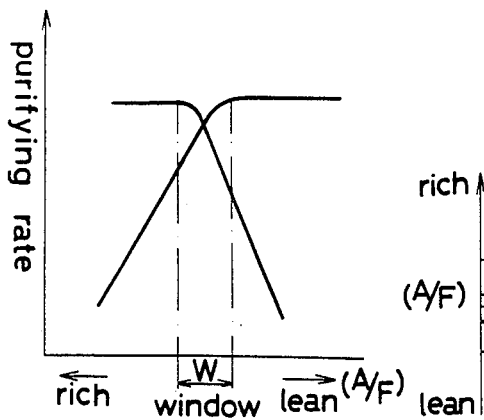
FIG. 6 (a) is a graph showing relationship between air-fuel ratio and purifying rate.
Figure 6C:
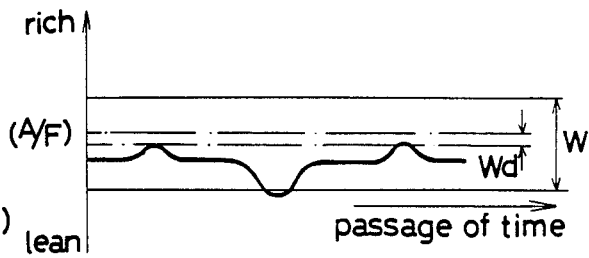
Figure 6B:
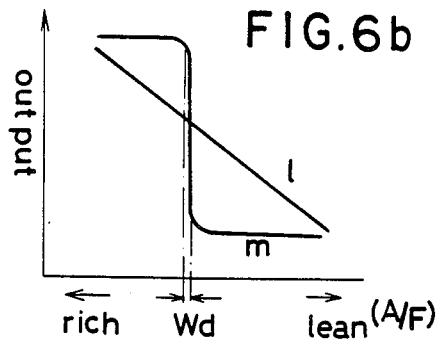
Figure 6D:
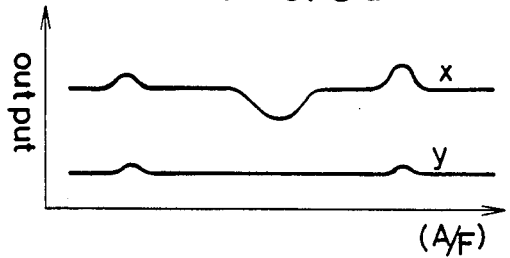

On the contrary, the catalyst (C), when deteriorated with the extended use, is rendered unable to reduce the toxicant components of (HC), (CO) and (NOx), thus making the air-fuel ratio of the exhaust gas pulsate against the theoretical level (T.L) in a manner as shown in FIG. 5, in which the acronym of A/F is the term of air-fuel ratio.

The increased level of pulsation causes the sensor 17 to generate the output of more than the predetermined value so as to activate the warning lamp 21 through the switching module 20.

As apparently understood from the foregoing description, the catalyst (C), when deteriorated in an unacceptable degree, causes to activate the annunciator (warning lamp 21) through the switching module 20 with high accuracy, thus effectively preventing the automobile from being continuously used without awaring of its deteriorated condition.

According to the invention, the sensor 17 is so constructed as to be in direct proportional relationship between the output and the air-fuel ratio, in opposition to a λ-sensor (lambda sensor) in which an excess coefficient is detected. The reason is as follows:

As seen in FIG. 6 (a) in which the relationship between the air-fuel ratio and the purifying rate is shown, a window indicated at (W) is a range in which tri-component of CO, HC and NOx are at a certain mixture ratio in the exhaust gas.

Further, FIG. 6 (b) shows how the sensor 17 according to the invention and the λ-sensor changes each output depending on the air-fuel ratio. The sensor 17 holds in substantially direct proportional relationship between the output and the air-fuel ratio as indicated at (1) on the one hand, the λ-sensor has an abrupt changing area (Wd) of the output at the middle of gas-lean and gas-rich area as at (m) on the other hand.

In general, the exhaust gas, after passing the catalyst, allows the air-fuel ratio to change in accordance with the passage of time as shown in FIG. 6 (c), rendering it impossible for the λ-sensor to detect the change of the air-fuel ratio except the abrupt changing area (Wd), since the area (Wd) is lesser than the window (W) of FIG. 6 (a), thus reducing the detecting accuracy in a significant degree (the air fuel ratio is determined to fall on the lean side of the catalyst window, in which the purifying effect begins to be somewhat lowered).

With the reason of above, the sensor 17 makes it possible to change the output in good accordance with the changing air-fuel ratio of FIG. 6 (c) as shown at (x) of FIG. 6 (d).

On the contrary, it is impossible for the λ-sensor to change the output in accordance with the changing air-fuel ratio of FIG. 6 (c), as shown at (y) of FIG. 6 (d), thus teaching that the λ-sensor is not suited to detecting the deterioration of the catalyst employed to the exhaust gas of this kind.

It is appreciated that instead of the warning lamp 21, a buzzer may be used as an annunciator.

It is further noted that a measurement device may be employed to continuouly indicate the deteriorating degree of the catalyst, and teaching the time period when the catalyst has to be replaced with new one.

In addition, the air-fuel ratio sensor is needed to be placed at the down reach of the catalyst (C) against the exhaust gas flow, not merely confining to the intermediate pipe 12.

While various changes may be made in the detailed construction, it is understood that such manage will be within the spirit and scope of the present invention.

The present invention is further described in the claims which follow:

What is claimed is:

1. A deterioration detector system for catalyst used in an emission gas purifier comprising:
   (a) a passageway through which exhaust gas from an internal combustion engine passes in contact with a catalyst to facilitate reducing and oxidizing reactions among gaseous components, hydrocarbon, carbon monoxide and nitrogen oxide;
   (b) a sensor placed in said passageway at a position downstream of said catalyst against a flow of said exhaust gas so as to generate an output substantially in direct proportion to air-fuel ratio of said exhaust gas, said sensor producing said output, the magnitude of which changes in a relationship with that of theoretical air-fuel ratio such that the greater the deterioration of said catalyst, the more removed the output of said sensor is from said theoretical air-fuel ratio; and
   (c) an annunciator arranged including a switching module (201) to be activated when said output level of said sensor reaches at a predetermined level.

2. A deterioration detection system for a catalyst used in an emission gas purifier in accordance with claim 1 wherein said sensor is a linear sensor comprising:
   (d) first and second solid electrolyte plates (A), (B) each arranged in opposed parallel spaced relationship so as to provice a chamber (109) therebetween;

(e) a ceramic spacer (108) interposed between first and second porous electrode layers (102), (104) of said solid electrolyte plates to maintain a space for said chamber (109);

(f) said first porous electrode layer (102) and a third porous electrode layer (101) each positioned to sandwich said first electrolyte plate (A), said third porous electrode layer (101) positioned opposite said chamber (109) being always in contact with reference oxygen gas (R);

(g) said second porous electrode layer (104) and a fourth porous electrode layer (105) each placed to sandwich said second electrolyte plate (B);

(h) said third porous electrode layer (101) being connected to a negative terminal of a comparator (OP3) through a first operational amplifier, said comparator (OP3) being connected at its positive terminal to ground through a battery and at its output terminal to said second porous electrode layer (104);

(i) a common point of said first porous electrode layer (102) connected to a positive terminal of a second operational amplifier (OP5); and (j) said first porous electrode layer (102) connected to said fourth porous electrode layer (105) whereby said second and said fourth porous electrode layers (104), (105) act on said second electrolyte plate (B) to maintain a constant air-fuel ratio in said chamber (109), and difference between voltage across said first and said third porous electrode layers (102), (101) and voltage (Vc) of said battery is produced from an output terminal of said second operational amplifier (OP5) as a signal of air-fuel ratio in said exhaust gas.

3. In a system as recited in claim 1, said catalyst is made from precious metals, such as platinum, palladium and rhodium.

4. In a system as recited in claim 1, said catalyst is placed between an exhaust port and a muffler of an internal combustion engine.

* * * * *